Aug. 8, 1950  C. N. BERGSTROM  2,518,273
LUBRICATOR FOR AUTOMOBILE SPRINGS
Filed Oct. 22, 1946

INVENTOR
C.N. BERGSTROM
BY [signature]
ATTORNEY

Patented Aug. 8, 1950

2,518,273

UNITED STATES PATENT OFFICE 2,518,273

LUBRICATOR FOR AUTOMOBILE SPRINGS

Carl N. Bergstrom, Portland, Oreg.

Application October 22, 1946, Serial No. 704,865

1 Claim. (Cl. 81—3.7)

This invention relates generally to the automotive industry and particularly to a lubricator for automobile springs.

The main object of this invention is to provide a means for introducing a lubricant between the leaves of the springs with the least amount of effort on the part of the operator and with the smallest amount of waste of the lubricant itself.

The second object is to produce a device of the class described which will be easy to manufacture and have a minimum number of parts.

I accomplish these and other objects in the manner set forth in the following specification as illustrated in the accompanying drawing, in which.

Similar numbers of reference refer to the same or similar parts throughout the several views.

Figure 1:
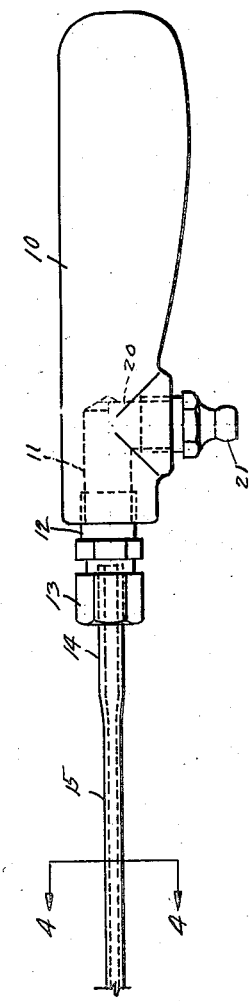
Fig. 1 is a side elevation of the device showing same in use for lubricating purposes.

Referring in detail to the drawing, there is shown in Fig. 1 an elongated handle 10 in one end of which is formed an axial opening 11 into which is threaded the fitting 12 provided with a compression coupling 13, into which is inserted an elongated tube 14, whose flattened portion 15 has an angling point 16, whose side 17 is cut away to provide a side outlet for the lubricant 18 which it is desired to force between the leaves 19 of the automobile springs.

The handle 10 is provided with a side outlet opening 20 into which is threaded a pressure gun fitting 21.

The pressure gun and its hose connections are not illustrated here as their use is well understood.

Figure 2:
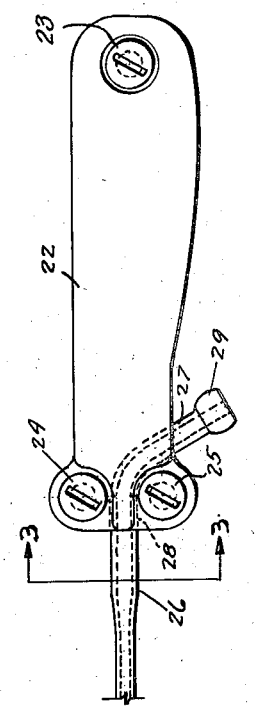
Fig. 2 is a fragmentary side elevation showing a modified form of the device.
Figure 3:
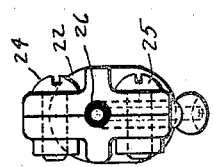
Fig. 3 is a section taken along the line 3—3 in Fig. 2.
Figure 4:
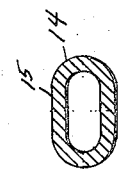
Fig. 4 is an enlarged section taken along the line 4—4 in Fig. 1.

In Figs. 2 and 3 are shown a modified form of the device in which the handle 22 is formed of two halves which are united by means of the screws 23, 24 and 25. The screws 24 and 25 are on opposite sides of the tubular needle 26, whose end 27 is bent along the groove 28 formed between the parts of the handle 22 and projects angularly to the tip 28 which normally engages the fitting of the pressure gun (not shown).

In this form of the device, at least three pieces are omitted and these are replaced only by means of the screws 23, 24, and 25. The main advantage in the form shown in Fig. 2 lies in the perfectly rigid connection formed between the members 26 and 22 and also in the fact that there are three less points of possible leakage and also that the cost of making the form is reduced to a minimum, and also that an inch is gained in the length by the elimination of the fittings 12 and 13.

In the operation of this device, it is only necessary to apply the pressure gun to the fittings 21 or 29 and insert the tip 17 as far as desired between the spring leaves 19 and then, by admitting pressure to the device, force the lubricant 18 to the desired parts.

I am, of course, aware that numerous forms of lubricators for automobile springs have been constructed in the past. I, therefore, do not claim such devices broadly but I do intend to cover such forms and modifications thereof as fall fairly within the appendant claim.

I claim:

A device of the class described consisting of a handle member composed of two parts having a curved passageway formed between the parts at one end thereof and having clamping screws for holding the two parts together, an elongated tubular needle having one curved end which occupies said groove and projects from the side of said handle, said projecting end having a pressure gun engaging tip, said needle having a point formed on the end remote from said handle, said point having one face thereof inclined with relation to the axis of the needle and having an opening therein communicating with the interior of the needle, the portion of said needle between said point and handle being flattened on its opposite sides thereof.

CARL N. BERGSTROM.

REFERENCES CITED

The following references are of record in the file of this patent:

UNITED STATES PATENTS

| Number | Name | Date |
|---|---|---|
| 1,491,202 | Early | Apr. 22, 1924 |
| 1,550,208 | Close | Aug. 18, 1925 |

FOREIGN PATENTS

| Number | Country | Date |
|---|---|---|
| 383,220 | Great Britain | Nov. 10, 1932 |